United States Patent
Frech et al.

(10) Patent No.: US 6,782,313 B1
(45) Date of Patent: Aug. 24, 2004

(54) DIAGNOSTIC TEST DEVICE FOR MOTOR VEHICLE WITH PROGRAMMABLE CONTROL DEVICES

(75) Inventors: Eberhard Frech, Kirchheim (DE); Wolfgang Wagner, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,617
(22) PCT Filed: May 10, 2000
(86) PCT No.: PCT/DE00/01445
§ 371 (c)(1),
(2), (4) Date: Mar. 11, 2002
(87) PCT Pub. No.: WO00/68659
PCT Pub. Date: Nov. 16, 2000

(30) Foreign Application Priority Data

May 11, 1999 (DE) .......................... 199 21 845

(51) Int. Cl.$^7$ .................. G01M 15/00; G05B 19/10
(52) U.S. Cl. ................... 701/31; 701/33; 701/35; 455/419
(58) Field of Search ............... 701/31, 29, 33, 701/35, 30, 32; 455/418, 419, 423

(56) References Cited

U.S. PATENT DOCUMENTS

| | | | |
|---|---|---|---|
| 5,036,479 A | 7/1991 | Prednis | 702/121 |
| 5,278,759 A * | 1/1994 | Berra et al. | 701/1 |
| 5,365,436 A | 11/1994 | Cornell | 701/33 |
| 5,541,840 A * | 7/1996 | Gurne et al. | 701/33 |
| 5,956,480 A * | 9/1999 | Kurihara | 714/52 |
| 6,134,488 A * | 10/2000 | Sasaki et al. | 701/31 |

FOREIGN PATENT DOCUMENTS

FR 2 719 919 A 11/1995

OTHER PUBLICATIONS

English Translation of FR 2,719,919.*
D. Nemec "Moeglichkeiten Komfortabler Testgeraete Zur . . . " in VDI Berichte NR. 687, 1988, pp. 365–385, month is not available.

* cited by examiner

Primary Examiner—Tan Q. Nguyen
(74) Attorney, Agent, or Firm—Michael J. Striker

(57) ABSTRACT

A diagnostic tester for motor vehicles is described, and programmable control units having self-diagnostic means are provided for in the motor vehicle that, in program-controlled fashion, control, monitor the engine control and other systems of the motor vehicle, generate error codes and store them, and which can be connected to an external diagnostic tester via a diagnostic/test plug in the motor vehicle. The external diagnostic tester is equipped with a program recognition and program loading device. The program version contained in the connected control unit is queried and recognized using the program recognition device. Then, if the program available in the motor vehicle and recognized via the diagnostic/test plug, available in the connected control unit of the motor vehicle is not stored in the latest and most current version, the respective latest version is loaded by the program loading device into the program storage device of the corresponding control unit.

6 Claims, No Drawings

DIAGNOSTIC TEST DEVICE FOR MOTOR VEHICLE WITH PROGRAMMABLE CONTROL DEVICES

BACKGROUND OF THE INVENTION

The invention is based on a diagnostic tester for motor vehicles having programmable control units.

Diagnostic testers for motor vehicles that contain programmable control units are generally known. Such programmable control units can contain self-diagnostic means and control, monitor the engine control and other systems of the motor vehicle in program-controlled fashion. In self-diagnosis, error codes are generated and stored. These control units and the error code storage devices can be connected to an external diagnostic tester via a diagnostic/test plug in the motor vehicle.

The interaction between motor vehicle control units having self-diagnostics and the external diagnostic tester are described in detail in an article, for example, by D. Nemec entitled "Möglichkeiten komfortabler Testgeräte zur Auswertung der Eigendiagnose von Steuergeräten im Kraftfahrzeug" ["Possibilities of convenient test units for the evaluation of self-diagnosis of control units in the motor vehicle"] in VDI Berichte ["VDI Reports"] No. 687, 1988, pages 365–385. Among other things, this article also discusses, on page 384, for example, that, with variant programming, entire control unit programs can be loaded into the unprogrammed control unit via the interface of the diagnostic/test plug. This is essential in particular before the start of a series, because the manufacturer can still change parameters at that point. Moreover, spare-parts stocking is reportedly easier, because it is sufficient to stock unprogrammed control units which can then be programmed and installed from case to case.

The system scope of engine controls provided for in motor vehicles has become very comprehensive due to the requirements for convenience, security, and diagnostics. For example, a Motronic engine control system has approximately 4,000 data that must be adapted to the requirements of the respective motor vehicle. Due to the generally tight time frame for the start of a series of engine controls, data or program changes cannot be ruled out during the current series. Today, engine controls having self-diagnostics are predominantly equipped with programmable flash storage devices. In order to reprogram to correct data or functions, the control units must be replaced or connected to programming units. If there are errors in the serial programs, high costs are incurred despite the ability to reprogram due to additional expense for the programming.

Object of the present invention is to indicate a possibility according to which the respective current version is cost-effectively programmed in the control units in simple fashion.

SUMMARY OF THE INVENTION

In contrast to the prior art, the diagnostic device according to the invention has the advantage that, during regular maintenance of the motor vehicle in the workshop, when the external diagnostic tester available in the workshop is connected, the programs available in the control units are automatically checked to determine which version they contain and that, if necessary, a reprogramming of the programs available in the control units is carried out by the external diagnostic tester equipped accordingly, so that the most current version is always available there. No additional work expenditure is created for the service personnel by the automatic procedure of checking and if necessary, programming. During maintenance work, e.g., during an oil change, the diagnostic tester is left connected until the current program record has been programmed. No additional costs are generated for the control units themselves, because an interface for reprogramming or programming is already available there. The customer therefore receives the respective current program status as part of maintenance work on the vehicle. Warranty costs for reprogrammings in the field can therefore be prevented as well. Moreover, It can be taken into account by means of the reprogramming in simple fashion that error-free programs are not always available in the condition at delivery as the complexity of systems increases.

According to the invention, this is achieved in principle by the fact that the external diagnostic tester is equipped with a program recognition and program loading device, and the program version contained in the connected control unit is queried and recognized using the program recognition device, and that then, if the program available in the motor vehicle and recognized via the diagnostic/test plug, available in the connected control unit of the motor vehicle is not stored there in the latest and most current version, the respective most current version is loaded by the program loading device of the diagnostic tester into the program storage device of the pertinent control unit of the motor vehicle.

According to an advantageous and suitable further development of the device according to the invention, in addition to the program for the motor vehicle control units having self-diagnostic means, in particular the program for engine control, programs of control units of other systems and subsystems provided for in the motor vehicle are also checked and, if necessary, newly loaded or reprogrammed. This provides a very flexible possibility for keeping the various control and diagnostic programs available in the various control units of a motor vehicle updated to the respective most current status.

In very suitable and advantageous embodiment and further development of the diagnostic tester according to the invention, the program version check and, if necessary, the required reprogramming, is carried out automatically by the external diagnostic tester. As a result, no particular attention is required by the maintenance and service personnel to carry out this point during maintenance and service work.

According to an advantageous embodiment of the device according to the invention, the external diagnostic tester is equipped with the respective latest versions of the necessary programs. Under certain circumstances, this can lead to too great of a demand on the storage device of the diagnostic tester.

According to a further very advantageous embodiment of the invention, it is therefore provided for that the external diagnostic tester automatically establishes communication with a central data base in order to check the program version and, if necessary, to obtain the current program version that applies for the control unit connected to the diagnostic tester and to store it there.

In a further advantageous embodiment of this version of the diagnostic tester according to the invention, the communication between the diagnostic tester and the central data base takes place-via dedicated line, or wirelessly via mobile telecommunication from the workshop or the motor vehicle itself.

In a further advantageous embodiment of the diagnostic tester according to the invention, it is provided for, in order to increase security, that the external diagnostic tester is equipped with a special authorization to check the program version currently available in the connected control unit of the motor vehicle and, if necessary, to reprogram the corresponding program.

The invention will now be explained in greater detail using an embodiment.

DETAILED DESCRIPTION OF THE PREFERRED EMBODIMENTS

According to the invention, the external diagnostic tester that is available in a service or repair workshop is equipped with a program recognition and program loading device. When the error storage devices of the various control units are read out via the diagnostic/test plug during servicing of the vehicle, therefore, the external diagnostic tester automatically checks, using the program recognition device simultaneously and preferably automatically, which program version and which data record is available in the control unit connected at that moment. The diagnostic tester then simultaneously compares whether the program and data record identified agrees with the most current status. If this is not the case, the most current version is loaded into the program storage device of the corresponding control unit by a program loading device, with which the external diagnostic tester is also equipped. New program and data status is therefore written to the corresponding memory areas of the connected control unit. The control unit is therefore newly programmed or reprogrammed accordingly. The control units used today are equipped with a flash storage device that can be programmed via the serial communication protocol via the diagnostic/test plug.

The external diagnostic tester in the workshop, in addition to the normal diagnostic work, therefore also performs the checking of the available program versions and, if necessary, the updating of the programs in the control units. The time required for reprogramming, if necessary, can then be spent by the diagnostic tester when the oil is changed in the vehicle, for example. To accomplish this, the external diagnostic tester is simply left connected to the vehicle for a longer period of time.

According to an embodiment of the invention, the latest program status for the individual control units used in various motor vehicles can be contained in the external diagnostic tester itself. To this end, CD-ROMs or similar comprehensive data carriers can regularly communicate the current program and data records to update the computer in the service centers.

It is also possible, however, and, in fact, generally much more suitable, to store all current program and data records for the control units used in the vehicles in one central data base. If the diagnostic tester checks a vehicle in the workshop, it then automatically establishes a connection with the central data base by means of its devices, in order to carry out the check for the latest program version, on the one hand, and, on the other, if absolutely necessary, to have the latest program record communicated to it by the central location, so that it stores this latest version in the corresponding memory area of the connected control unit by means of its program loading device.

The connection between the diagnostic tester in the workshop and the central location can take place either via a dedicated line or a wireless telephone to the telephone outlet in the workshop, or also via wireless mobile telecommunication from the workshop or even the motor vehicle itself to the central data base. Communication devices already available in the vehicle itself can be used for this purpose, if necessary. For security reasons, the external diagnostic tester is advantageously equipped with a corresponding special authorization to perform checks and reprogramming.

In advantageous fashion, the invention allows the updating of programs available in control units without requiring considerable additional expense for this. The most current program and data status in the corresponding control units is therefore always available to the motor vehicle driver in his motor vehicle.

What is claimed is:

1. An external diagnostic tester for motor vehicles, the motor vehicles having programmable control units with self-diagnostic means, wherein the control units can be connected to the external diagnostic tester via a diagnostic/test plug in the motor vehicle, the external diagnostic tester comprising, a program recognition and program loading device, wherein a program version contained in a connected control unit is queried and recognized by means of the program recognition device, and, if the program available in the motor vehicle and recognized via the diagnostic/test plug is not stored there in a latest and most current version, a respective most current version is loaded by the program loading device into a program storage device of the pertinent control unit of the motor vehicle, wherein the external diagnostic tester automatically establishes communication with a central date base in order to check the program version and, if necessary, to obtain the current program version that applies for the control unit connected to the diagnostic tester and to store it there.

2. The external diagnostic tester according to claim 1, wherein, in addition to the program for the control units in the motor vehicle having self-diagnostic means, a program for engine control, programs of control units of other systems and subsystems provided for in the motor vehicle are also checked and, if necessary, newly loaded or reprogrammed.

3. The external diagnostic tester according to claim 1, wherein the external diagnostic tester automatically carries out a program version check and, if necessary, necessary programming.

4. The external diagnostic tester according to claim 1, wherein the external diagnostic tester is equipped with the respective latest versions of necessary programs.

5. The external diagnostic tester according to claim 1, wherein a communication takes place via a dedicated line, or wirelessly via mobile telecommunication from a workshop or the motor vehicle itself.

6. The external diagnostic tester according to claim 1, wherein the external diagnostic tester is equipped with an authorization to check the program version currently available in the connected control unit of the motor vehicle, and, if necessary, to reprogram a corresponding program.

* * * * *